United States Patent
Naumann et al.

(10) Patent No.: US 6,896,103 B2
(45) Date of Patent: May 24, 2005

(54) DEVICE AND METHOD FOR APPLYING LUBRICATING OIL

(75) Inventors: Oliver Naumann, Muendersbach (DE); Ralf Michels, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,067

(22) Filed: Jun. 6, 2002

(65) Prior Publication Data

US 2002/0189904 A1 Dec. 19, 2002

(30) Foreign Application Priority Data

Jun. 19, 2001 (EP) .............................. 01114618

(51) Int. Cl.[7] .............................................. F16N 21/00
(52) U.S. Cl. .................. 184/105.1; 184/1.5; 184/80
(58) Field of Search .................... 184/5.1, 80, 82, 184/89, 105.1–105.3; 222/518, 507, 509; 141/346, 351, 353, 354

(56) References Cited

U.S. PATENT DOCUMENTS

| | | | | |
|---|---|---|---|---|
| 1,754,723 A | * | 4/1930 | McGahey ................ | 251/149.5 |
| 2,839,160 A | * | 6/1958 | Wright .................... | 184/5.1 |
| 2,866,520 A | * | 12/1958 | Sharp ..................... | 184/5.1 |
| 3,365,024 A | * | 1/1968 | Freda ..................... | 184/5.1 |
| 4,281,779 A | * | 8/1981 | Shepard ................. | 222/501 |
| 4,293,056 A | * | 10/1981 | Setree, II ............... | 184/5.1 |
| 4,555,047 A | * | 11/1985 | Ackley .................. | 222/192 |
| 5,810,495 A | | 9/1998 | McAuley | |
| 6,155,380 A | * | 12/2000 | Ichikawa et al. ...... | 184/5.1 |
| 6,473,954 B1 | * | 11/2002 | Rosberg et al. ....... | 29/243 |

FOREIGN PATENT DOCUMENTS

EP 0-353-881 B1 2/1996
FR 2-607-686 12/1986

* cited by examiner

*Primary Examiner*—Chong H. Kim
(74) *Attorney, Agent, or Firm*—Raymond L. Coppiellie

(57) ABSTRACT

The invention relates to a device (10) for depositing a flowable medium, in particular lubricating oil, onto a workpiece (16). The device (10) has a base body (13) having a duct (14*a*) for supplying the lubricating oil, the duct (14*a*) ending in a cavity (14*d*). The cavity (14*d*) is covered by a mask (15) having an opening. The opening of the mask (15) is closed by a hard metal sphere (11) which is prestressed into this closure position by a spring (12). When contact is made with a workpiece the sphere is pressed into the cavity (14*d*) and thereby opens up the opening in the mask (15) for the discharge of lubricating oil.

2 Claims, 3 Drawing Sheets

DEVICE AND METHOD FOR APPLYING LUBRICATING OIL

BACKGROUND OF INVENTION

1. Field of the Invention

The invention relates to a device for applying a flowable medium, in particular a lubricating oil, onto a workpiece, said device containing at least one duct having at least one outlet for the medium. Furthermore, the invention relates to a method for depositing a flowable medium, in particular a lubricating oil, onto a workpiece.

2. Description of the Related Art

During the assembly of machines it is frequently necessary to provide the workpieces which are to be put together with a layer of lubricating oil, so that they can be put together without any problem and without the parts being damaged. Thus, for example, during the assembly of oil filters or air filters of motor vehicle engines the sensitive rubber seals are protected, by a previous wetting with lubricating oil, from being damaged when the components are being pushed together. The depositing of the lubricating oil currently takes place by spraying the parts with an oil mist. However, this procedure has the disadvantage that excess oil mist is emitted into the surrounding atmosphere, which results in stresses for the working personnel and for the environment. Furthermore, the dispersing mist also wets objects with oil which are not part of the installation process, which leads in consequence to the adhesion of dirt and therefore to malfunctions. Apart from these disadvantageous consequences, the excess oil mist does, of course, also cause additional costs through the consumption of material.

DESCRIPTION OF THE PRIOR ART

DE 43 41 394 A1 discloses a device for the internal coating of holes, in which the flowable coating agent is guided via a duct to an outlet of the device. The outlet is designed as a slinging cylinder which rotates and in the process slings the coating agent radially outward onto the hole walls because of the centrifugal force. However, a device of this type is very complex and expensive and, moreover, is suitable only for depositing a medium onto the internal surfaces of holes. In the case of other surface forms, similar problems to those in the spraying of workpieces would arise due to the medium being slung in all directions.

SUMMARY OF INVENTION

Against this background, an object of the present invention is to provide a device and a method for depositing a flowable medium, such as, in particular, a lubricating oil, with which device and with which method a targeted and economical wetting of the workpiece is possible in a simple and cost-effective manner.

The present invention is a device for applying a flowable medium, such as, in particular, a lubricating oil, a liquid bonding agent, a small-grained powder or the like, onto the surface of a workpiece contains at least one duct via which the medium to be applied can be conducted from a store to at least one outlet arranged at the end of the duct. In the device, a closure element is arranged in the abovementioned outlet (or in each case in the plurality of outlets), which closure element can be moved between a closure position, in which it closes the outlet, and an opening position, in which it opens up the outlet. Furthermore, the closure element is prestressed by an elastic spring element into the closure position, and it protrudes outward over the outlet in such a manner that it can be transferred into the opening position, when in contact with a workpiece to be treated, by the contact pressure.

The device according to the invention permits a targeted application of a flowable medium, such as, for example, a lubricating oil, onto a workpiece. The medium can only be discharged from the device if the outlet of the device is opened up. Said opening-up takes place by the transfer of the closure element situated in the outlet from the closure position into the opening position. In the normal state, the closure element is situated in the closure position, since it is prestressed into this position by the spring element. Only if a corresponding counterforce overcomes the spring force is the closure element displaced into the opening position and the outlet is opened up as a result. The design of the device ensures that the abovementioned counterforce can be applied by the device or the closure element of the device making contact with a workpiece to be wetted. In order for this to be possible, the closure element protrudes with an exposed section over the outlet, with the result that it is the first part to come into contact with a workpiece as it approaches the workpiece. The contact pressure which arises in the process then displaces the closure element into the opening position, the dimensioning of the outlet and of the closure element advantageously being selected in such a manner that other parts of the device—such as, in particular, the edge of the outlet—also come into contact with the workpiece in the opening position of the closure element. By means of the resulting "sitting" of the device on the workpiece, a further exertion of pressure on the closure element is prevented.

The design described for the device has the advantage that said device can be realized relatively simply and cost-effectively and that it permits particularly simple handling. In order to deposit a medium, for example a lubricating oil, onto a workpiece, the device has merely to be brought, with the closure element in front, into contact with the workpiece. As soon as there is contact and a corresponding contact pressure is produced, the outlet of the device automatically opens in order to allow the medium to be discharged. The medium is therefore deposited onto the workpiece in an extremely targeted manner, both in terms of time and in terms of space. An emission of medium into the atmosphere is prevented, as a result of which the device obtains appropriate economical and ecological advantages.

According to a preferred refinement of the invention, the at least one outlet for the medium is formed by a cavity which is situated at the end of a duct, the closure element being arranged in the cavity and the cavity together with the closure element being covered to the outside by a mask. The mask has an opening which is shaped and dimensioned in such a manner that it only allows the closure element to partially, but not completely, pass through, and that it is closed by the closure element when the latter is situated in its closure position. The cavity of an outlet of this type is supplied with medium via the connection to the duct. This medium can in principle be discharged to the outside through the opening in the mask, this opening, however, normally being closed by the closure element. Only if the closure element is pushed back is the opening opened up and the discharge of medium to the outside possible. It can be ensured in this case, by an appropriate dimensioning of the closure element and opening, that a relatively large opening cross section is opened up in the opening position of the closure element, with the result that a large volumetric flow of medium can be discharged. The partial passage of the closure element through the opening to the outside enables this part of the closure element which is passing through to be brought into contact with a workpiece and, in the process, to be pushed, on account of the contact pressure, into the cavity by opening up the opening.

According to a development of the last-explained refinement, a spring is arranged in the cavity of the outlet, which spring is in contact with the closure element and presses the latter against the opening in the mask. This has the effect that the closure element is prestressed into the closure position in the desired manner. The spring is accommodated in a space-saving manner in a cavity which is present in any case.

In principle, the closure element can assume any desired form as long as its movability between a closure position and an opening position and the closing and opening-up of the outlet associated with said movability are ensured. However, the closure element is preferably in the symmetrical form of a sphere or a cylinder.

The last-mentioned forms are particularly suitable if the closure element is to be fitted displaceably and rotatably in the outlet. In this case, the rotatability can be used for conveying the medium to the outlet. In the process, medium adheres to the closure element in the opening position of the closure element and is conveyed to the outside by the rotation of the closure element.

According to a preferred refinement of the device, said device has a flat, convexly curved or concavely curved working surface in which a plurality of outlets for the medium are arranged. The working surface is that part of the device which is brought toward a workpiece to be wetted and is brought into contact with the latter. This working surface is preferably designed in accordance with the shape of the workpiece to be treated (i.e. is complementary to it). In the case of planar workpieces the working surface is therefore preferably likewise planar, in the case of cylindrical workpieces said working surface is preferably concavely curved in accordance with the internal surface of a hollow cylinder, and, in the case of hollow cylindrical workpieces, said working surface is preferably designed as a convexly curved cylinder. The adaptation of the shape of the working surface to the shape of the workpiece has the advantage of enabling the working surface and workpiece to come closer to each other over a relatively large region, in which case a plurality of outlets of the device can come simultaneously into contact with the workpiece and can transfer a medium onto the workpiece.

In the case of the last-mentioned refinement of the device, the plurality of outlets are preferably supplied by a central feedline for the medium, from which branches to the respective outlets originate. If appropriate, the device may also have a modular construction, in which different "working heads" with the branches and outlets can be coupled onto a base body having the central feedline for the medium.

The invention furthermore relates to a method for depositing a flowable medium, such as, in particular, a lubricating oil, onto a workpiece. The method is one wherein a device of the abovementioned type is used for the depositing, i.e. a device in which the medium is guided via at least one duct to at least one outlet, the outlet being closed by a spring-loaded closure element. In the method, the medium which is applied by the device is under positive pressure relative to the atmospheric pressure, in which case, however, the positive pressure can be relatively small and typically has a value of 0.5 The at least one closure element of the device is transferred from the closure position into the opening position by contact with the workpiece.

With a method of this type, flowable medium, such as, for example, lubricating oil, can be deposited onto a workpiece in an extremely targeted manner. In this case, the positive pressure which the medium is under ensures an automatic discharge of the medium as soon as the closure element opens up the outlet. The discharge of the medium does not therefore depend on the gravitational force and on a certain position of the device. It can be established, by means of the level of the pressure, at what flow rate the medium is to be discharged.

A device is preferably used which contains a plurality of outlets having closure elements. This device can then be used in such a manner that a plurality of the closure elements (preferably all of them) are simultaneously brought into contact with the workpiece. The medium can therefore be discharged simultaneously in parallel at various points, which enables a correspondingly more rapid wetting of the workpiece.

Furthermore, a device is preferably used in which the closure element is mounted rotatably. A device of this type can be used in such a manner that it is moved along the surface of the workpiece, the closure element rolling along the surface of the workpiece in the opening position. By means of the rolling movement, the closure element is involved in actively conveying the medium from the device onto the workpiece.

BRIEF DESCRIPTION OF DRAWINGS

The invention will be explained in greater detail and by way of example below with reference to the figures, in which.

DETAILED DESCRIPTION

The present invention will be explained in the figures using the example of applying lubricating oil. However, the invention is not restricted to this use and may in principle also be used in the application of similar flowable media, such as, for example, bonding agents, if a point-by-point application of the medium is desirable or is sufficient.

The devices which are illustrated are suitable, in particular, for oiling workpieces during the assembly of motor vehicle parts. According to the current prior art, oiling in such a manner generally takes place by spraying the oil via spray nozzles. The emissions of spray mist occurring in the process are often not sucked up for reasons of cost, and therefore constitute a stress for the environment. This disadvantageous situation is avoided by the device according to the invention.

Figure 1:
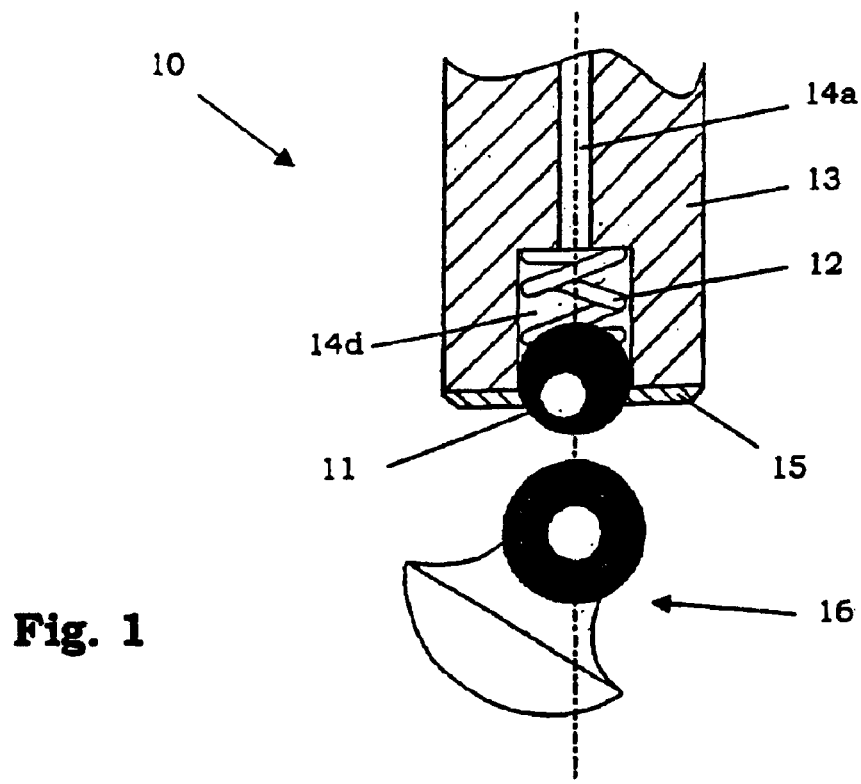
FIG. 1 shows a cross section through a device for the point-like application of lubricating oil.

The device 10 which is illustrated in FIG. 1 reproduces the basic principle of the invention. The device 10 comprises a base body 13, which is of approximately pin-shaped configuration, at least at its working end. A duct 14a runs centrally through the base body 13 and connects a store for the lubricating oil to be applied (not illustrated) to the outlet of the device 10.

The outlet of the device 10 is formed by a cavity 14d which is situated at the end of the duct 14a and is covered by a mask 15. Situated in the cavity is a sphere 11 which preferably consists of hard metal and partially protrudes outward through the opening in the mask 15. However, said opening is smaller than the diameter of the sphere 11 and so the sphere 11 cannot come out of the cavity 14d.

A spiral spring 12, which is supported at that end of the cavity 14d which is at the top in the drawing, presses the sphere 11 against the opening in the mask 15, with the result that the sphere 11 closes the opening exactly. In this "closure position" of the sphere 11, which position is illustrated in the figure, it is not possible, therefore, for oil to be discharged out of the device 10.

Only when the device 10 or the sphere 11 is brought into contact with a workpiece, for example a crankshaft 16, and the sphere 11 is pressed in the process into the cavity 14d counter to the pressure of the spring 12 ("opening position") is the opening in the mask 15 opened up, and lubricating oil can be discharged. This lubricating oil is then transferred onto the workpiece 16 at precise points. If the device 10 is not only pressed vertically onto the workpiece but is also guided tangentially along the latter, it is also possible for the sphere 11 to rotate, in which case the sphere 11 drags along lubricating oil and applies it on its lower side onto the workpiece 16.

Unlike in the case of spraying lubricating oil, when the device 10 is used spraying mists which would be emitted into the surroundings are not produced. Any overflow oil which arises can be collected in its entirety and reused. A device of this type is therefore very economical to use and is absolutely wear- and maintenance-free.

It is also advantageous that the device 10 can be operated with the lubricating oil at a very low pressure of, typically, 0.5 bar. The lubricating oil, which is provided from external pressure tanks via a pipeline system (not illustrated) is sharply reduced in its pressure via a fine restriction valve and is supplied to the outlets of the device.

Figure 2:
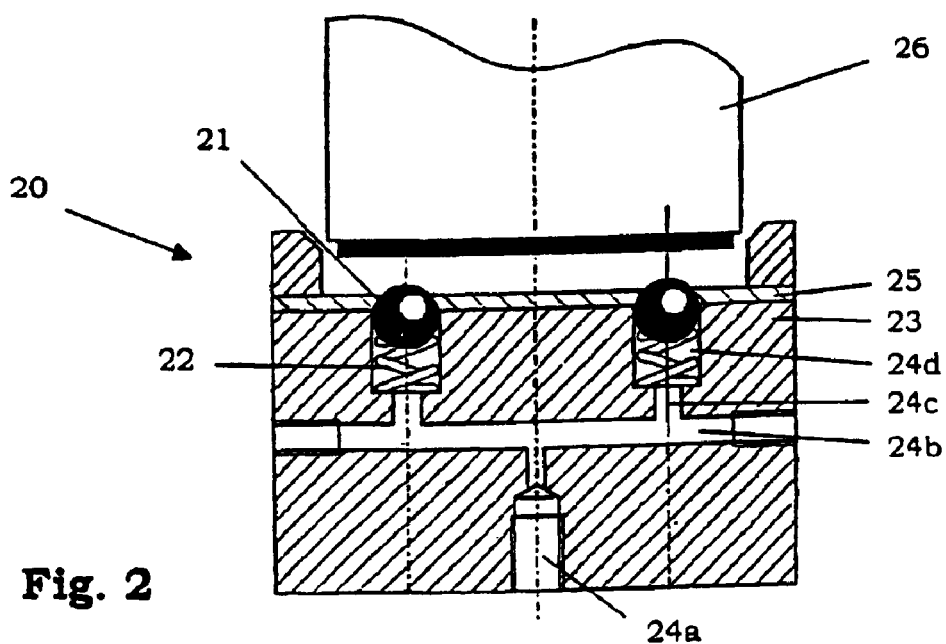
FIG. 2 shows a device for the multi-point application of lubricating oil onto a flat surface.

FIG. 2 shows, in cross section, an expanded device 20 in which there are a plurality of outlets, two of which can be seen in the figure. Parts which correspond to those of FIG. 1 are provided with reference numbers corresponding to the ones in figure starting at the number 20 (instead of 10).

Lubricating oil supplied to the device 20 via a fine restriction valve (not illustrated) is conducted via a central feedline 24a into an annular duct 24b and is distributed by the latter. Branches 24c originate from the annular duct 24b and the outlets for the lubricating oil are situated at the ends of said branches. These outlets are formed in turn by cavities 24d which are covered by a mask 25. The openings of the mask 25 are closed by hard metal spheres 21 which are prestressed into their closure positions by springs 22.

The mask 25 forms a flat surface from which only the spheres 21 protrude upwards for a short distance. When this flat surface comes into contact with a likewise flat workpiece, for example an oil filter 26, the spheres 21 are simultaneously pressed into the cavity 24d counter to the spring force and the openings in the mask 25 are therefore opened up. This enables lubricating oil to be discharged simultaneously at all of the outlets, with the result that the workpiece 26 can be oiled in a single working step.

Figure 3:
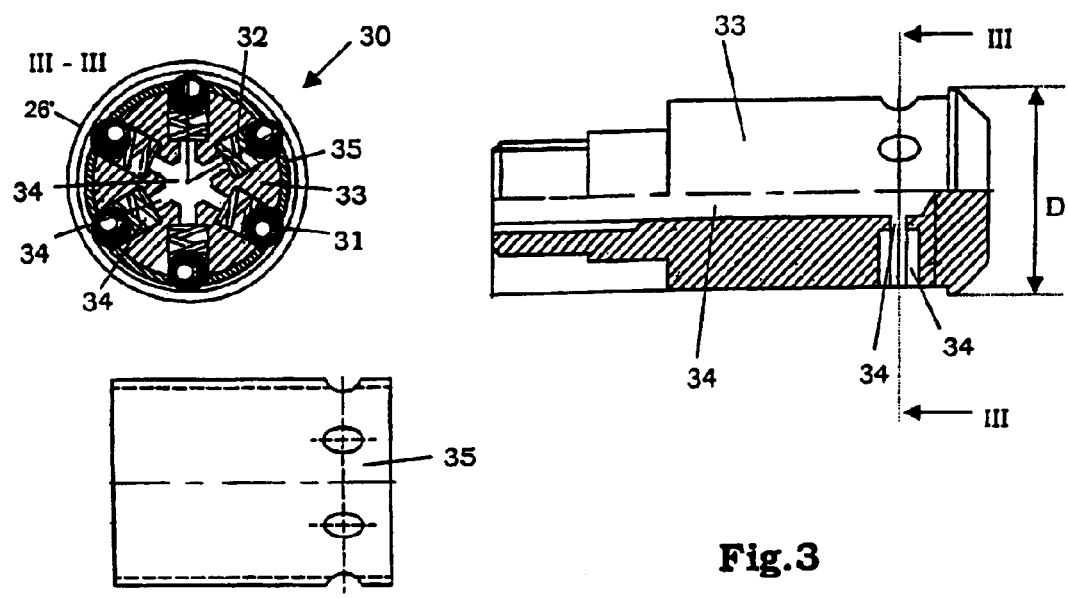
FIG. 3 shows a device for applying lubricating oil onto the internal surface of a hole, in a side view of its parts and in a cross section.

Similarly to FIG. 2, FIG. 3 shows a device 30 for depositing lubricating oil from a plurality of outlets. Similar components are again provided here with corresponding reference numbers, beginning at the number 30. In the right-hand part of FIG. 3 the base body 33 of the device 30 is illustrated in a side view and partially in section. The central feedline 34a for the lubricating oil, from which branch lines 34b originate radially outward and lead to cavities 34d, can be seen here.

As can be seen from the section along the line III-III in the left, upper part of FIG. 3, the base body 33 has a cylindrical shape, six outlets being distributed uniformly over the circumference of the cylinder. The outlets are covered to the outside by a cylindrical, sleeve-shaped mask 35 (illustrated at the bottom on the left in FIG. 3 in the side view). The outlets themselves are in each case formed by a cavity 34d in which a spring element 32 and a hard metal sphere 31 are situated in a known manner.

The device 30 which is illustrated in figure 3 is suitable for oiling cylindrical holes 26' whose inside diameter is larger than or equal to the outside diameter D of the device 30.

Figure 4:
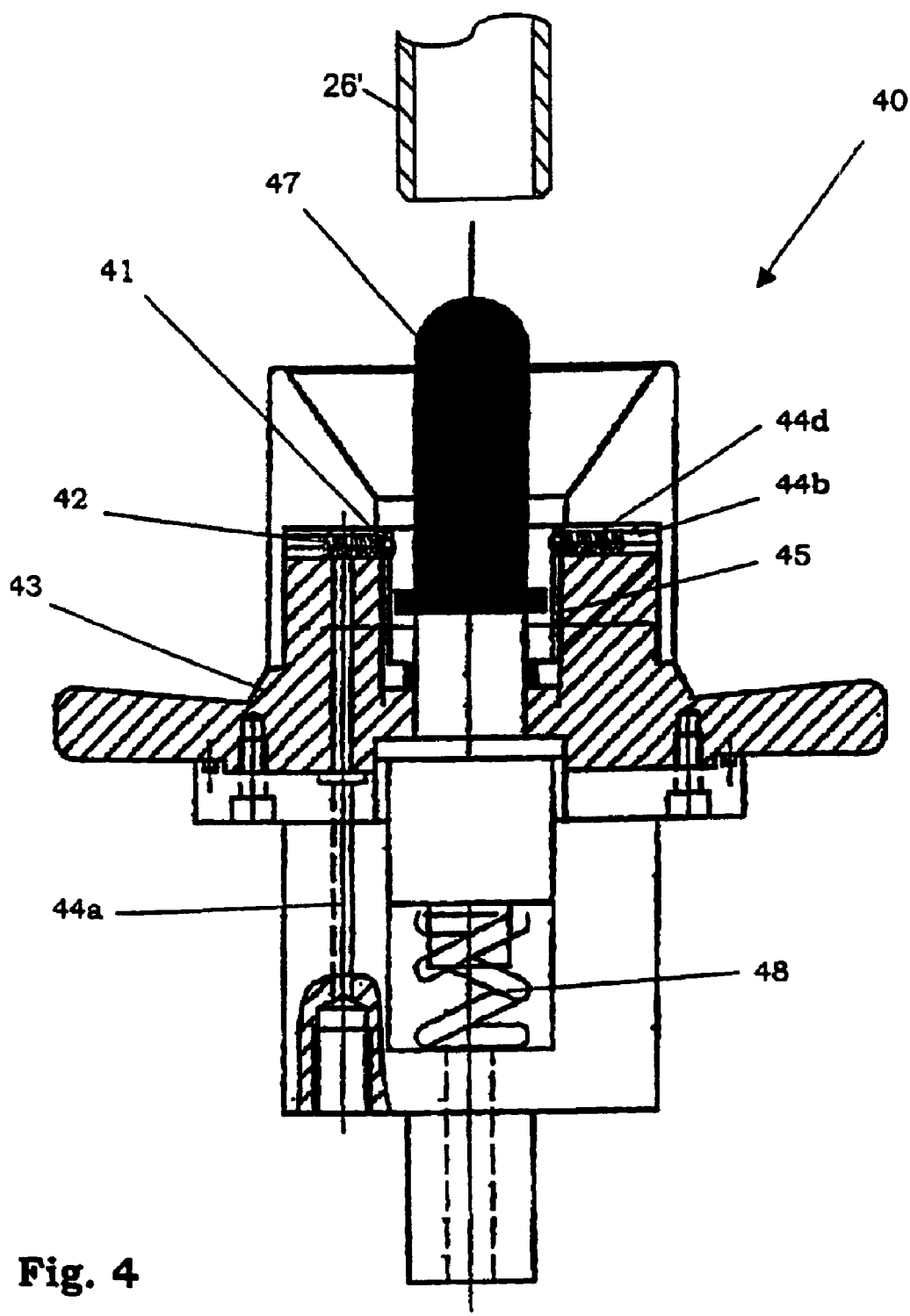
FIG. 4 shows, in cross section, a device for applying lubricating oil on the outer surface of a cylindrical workpiece.

FIG. 4 illustrates a device with which cylindrical outer surfaces of sleeves 26', for example of an oil filler neck, can be oiled. Identical parts are again provided with corresponding reference numbers, beginning at the number 40.

Lubricating oil is supplied through a duct 44a that runs through the base body 43 of the device 40. The duct 44a merges at its end into an annular duct 44b from which the outlets for the lubricating oil originate, pointing radially inward. The outlets are covered by a sleeve-shaped mask 45, the openings of the mask, which are assigned to the outlets, being closed by a spherical closure element 41. The closure element 41 is situated in a cavity 44d and is prestressed into its closure position by springs 42.

A pin 47 protrudes vertically upward in the central axis of the device 40, the pin 47 being supported at its lower end on a spiral spring 48. Compression of the spring 48 enables the pin 47 to be pushed in the axial direction into the device 40.

This is the case in particular if a sleeve-shaped workpiece 26' is put over the pin 47 and is pressed together with the pin 47 into the device 40. In the process, a sleeve-shaped workpiece 26' of this type is in contact with the spheres 41 of the outlets of the lubricating oil and presses said spheres into the particular outlets to such an extent that the outlets are opened up and lubricating oil can be discharged. This lubricating oil then wets the surface of the sleeve-shaped workpiece as it is guided past.

What is claimed is:

1. A devise for applying a fluid onto a surface, comprising:
   a work surface which is substantiafly concave curved for engagement with said surface;
   a plurality of outlets arranged in said work surface for permitting transfer of said fluid onto said surface;
   a duct through which said fluid is flowable to said outlets;
   a closure member disposed rotatably and displaceably in each of said outlets for movement between a first position in which said closure element closes said outlet and a second position in which said closure element opens said outlet for dispensing said fluid onto said surface;
   each of said closure members protruding outwardly over the work surface and being configured to be pressed by said surface when in contact therewith for movement of said closure member from the first position to the second position;
   a spring for urging said closure member into said first position and for returning said closure member from said second position to said first position; and
   a pin for supporting a workpiece having a cylindrical tubelike part, wherein said pin is movable from first position, where said workpiece is placed with said cylindrical tubelike part onto said pin, to a second position where the external surface of said cylindrical tubelike part is brought into contact with said closure members for dispensing said fluid onto said external surface.

2. A device according to claim 1, further comprising a spring urging said pin into said first position and for returning said pin from said second position to said first position.

* * * * *